United States Patent [19]
Stockhausen

[11] Patent Number: 5,459,768
[45] Date of Patent: Oct. 17, 1995

[54] SAFETY DEVICE AGAINST OVERPRESSURE FAILURE OF A NUCLEAR REACTOR PRESSURE VESSEL

[75] Inventor: Horst-Dieter Stockhausen, Nürnberg, Germany

[73] Assignee: Siemens Aktiengesellschaft, Munich, Germany

[21] Appl. No.: 298,570

[22] Filed: Aug. 31, 1994

[63] Continuation of International Application Serial No. PCT/DE93/00180, filed Mar. 2, 1993.

[30] Foreign Application Priority Data

Mar. 3, 1992 [DE] Germany .......................... 42 06 661.1

[51] Int. Cl.⁶ .................................................. G21C 9/004
[52] U.S. Cl. ........................................... 376/284; 220/89.4
[58] Field of Search .................................... 376/284, 283, 376/247; 220/89.4; 137/72; 236/92 C

[56] References Cited

U.S. PATENT DOCUMENTS

| 2,742,179 | 4/1956 | Livers | 220/89.4 |
|---|---|---|---|
| 4,567,016 | 1/1986 | Tong | 376/283 |
| 4,777,013 | 10/1988 | Wolters et al. | 376/283 |
| 4,836,443 | 6/1989 | Wolters et al. | 376/283 |
| 5,080,857 | 1/1992 | Miller et al. | 376/284 |

FOREIGN PATENT DOCUMENTS 3526377 2/1987 Germany .

*Primary Examiner*—Daniel D. Wasil
*Attorney, Agent, or Firm*—Herbert L. Lerner; Laurence A. Greenberg

[57] ABSTRACT

A safety device against overpressure failure of a nuclear reactor pressure vessel in case of inadequate core cooling, includes a pressure relief system responding as a function of temperature. A differential-pressure-loaded pressure relief valve set in a wall or an immediately adjacent pipeline of the pressure vessel which is exposed to primary pressure, has a closure piece that is preferably a differential-pressure piston being mounted so as to be longitudinally displaceable and being sealingly retained in a closure position thereof by a fusible stop. When an upper threshold temperature is reached in the interior of the reactor, which causes the fusible stop to melt due to a threshold temperature heat flow reaching the stop, the differential-pressure piston is moved into an opened position thereof. With correspondingly lower cross-sectional dimensions of the pressure relief valve and lines connected thereto, the pressure relief line may alternatively be constructed as a control line for a separate relief valve.

11 Claims, 2 Drawing Sheets

1

SAFETY DEVICE AGAINST OVERPRESSURE FAILURE OF A NUCLEAR REACTOR PRESSURE VESSEL

CROSS-REFERENCE TO RELATED APPLICATION

This application is a Continuation of International Application Serial No. PCT/DE93/00180, filed Mar. 2, 1993.

BACKGROUND OF THE INVENTION

Field of the Invention

The invention relates to a safety device against overpressure failure of a nuclear reactor pressure vessel in case of insufficient cooling of the core.

If the extremely improbable failure of all of the cooling devices of the reactor core is assumed in a nuclear power station in general, and in a pressurized-water reactor nuclear power station in particular, there is a risk of the reactor core overheating. In a pressurized-water nuclear power station, an unacceptable overpressure in the primary circuit is prevented by the pressurizer system containing spray and pressure relief devices. A pressurizer relief tank serves to condense the steam blown off upon opening of the pressurizer valves, relief valves and safety valves and of the volume control system safety valves. The pressurizer relief tank is filled with water to about two thirds, above which there is a nitrogen cushion. In the case of pressurized-water reactors, the primary circuit is at a pressure of, e.g., 158 bar (normal operation).

German Published, Non-Prosecuted Application DE 35 26 377 A1, corresponding to U.S. Pat. No. 4,777,013, describes a high-temperature reactor with a reactor pressure vessel and a safety valve, being constructed as a spring valve, for limiting the pressure in the reactor pressure vessel in case of core heat-up accidents. The reactor pressure vessel is lined on its inside with a liner connected to a liner-cooling system. The valve spring of the safety valve is formed of a material having an elastic force which decreases with increasing temperature. When the safety valve is open, the valve spring is exposed to outflowing gas and is connected to the liner-cooling system for the purpose of cooling.

The invention is based on the concept of substantially reducing the popping or blow-off response pressure in the cooling circuit of a nuclear reactor as a function of temperature, especially in the primary circuit of a pressurized-water reactor, so that in the very unlikely case of the reactor core overheating, the primary-circuit pressure is automatically reduced to values below 30 bar.

SUMMARY OF THE INVENTION

It is accordingly an object of the invention to provide a safety device against overpressure failure of a nuclear reactor pressure vessel, which overcomes the hereinafore-mentioned disadvantages of the heretofore-known devices of this general type, which permits the above-mentioned criterion to be met and which thus forms a barrier against overpressure failure of the nuclear-reactor pressure vessel in the case of overheating of the core.

With the foregoing and other objects in view there is provided, in accordance with the invention, in a nuclear reactor having an interior, a pressure vessel, a coolant conducting surface exposed to primary pressure, such as a wall or pipeline of the pressure vessel, and a core, a safety device against overpressure failure of the pressure vessel upon insufficient cooling of the core, comprising a differential-pressure-loaded pressure relief valve being set in the coolant conducting surface, the pressure relief valve having a hollow guide cylinder, a closure piece in the form of a differential-pressure piston being constructed as a hollow body and being longitudinally displaceable in the hollow guide cylinder between a closure position and an opening position, and a fusible stop sealing and retaining the differential-pressure piston in the closure position, the fusible stop melting due to a threshold temperature heat flow reaching the fusible stop upon reaching an upper threshold temperature in the interior of the reactor, for permitting the differential-pressure piston to move into the opening position.

In accordance with another feature of the invention, the pressure relief valve has seating surfaces, the differential-pressure piston has sealing surfaces, and the fusible stop is disposed between the sealing surfaces and the seating surfaces.

In accordance with a further feature of the invention, the differential-pressure piston has peripheral piston surfaces, the guide cylinder has an inner periphery with guide surfaces, and the fusible stop is additionally disposed between the peripheral piston surfaces and the guide surfaces.

In accordance with an added feature of the invention, the pressure relief valve has a valve body with a wall and an inner periphery and the guide cylinder has an outer periphery, defining an annular duct remaining free as an overflow duct between the inner and outer peripheries; the pressure relief valve has vanes being disposed in the annular duct and joined to the wall of the valve body for holding the guide cylinder in a centered position in the valve body; and the overflow duct has an inlet cross section being normally sealed by the differential-pressure piston in the closure position and being cleared and released in the opened position.

In accordance with an additional feature of the invention, the guide cylinder has an end facing away from the differential-pressure piston, and the end has a bottom with a pressure relief orifice formed therein.

The main advantages which can be achieved by means of the invention are that, when a certain threshold temperature in the reactor core is reached, which is distinctly below the failure temperature of the reactor pressure vessel, the fusible stop is caused to melt and the closure piece is thus released. The system pressure (reactor pressure) causes the preferably employed differential-pressure piston to be displaced in its guide cylinder as far as a piston end stop. After the piston end stop is reached, the system pressure is reduced through the relief cross section which is thus opened, to values below 30 bar.

In accordance with yet another feature of the invention, the pressure relief valve is set into the wall of a primary coolant pipe near the nuclear reactor pressure vessel.

In accordance with yet a further feature of the invention, the pressure relief valve is set into the wall of the pressure vessel at the level of the primary coolant pipe sockets and in wall sections between them.

In accordance with yet an added feature of the invention, the pressure relief valve is connected to a pressurizer discharge line opening into a pressurizer relief tank.

In accordance with a concomitant feature of the invention, with correspondingly lower cross-sectional dimensions of the pressure relief valve and the lines connected thereto, the pressure relief line is alternatively constructed as a control line for a separate relief valve.

Among fusible alloys, silver solder alloys have been found to be particularly advantageous and they are stable and radiation-resistant in a temperature range up to approximately 700° C.

Other features which are considered as characteristic for the invention are set forth in the appended claims.

Although the invention is illustrated and described herein as embodied in a safety device against overpressure failure of a nuclear reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
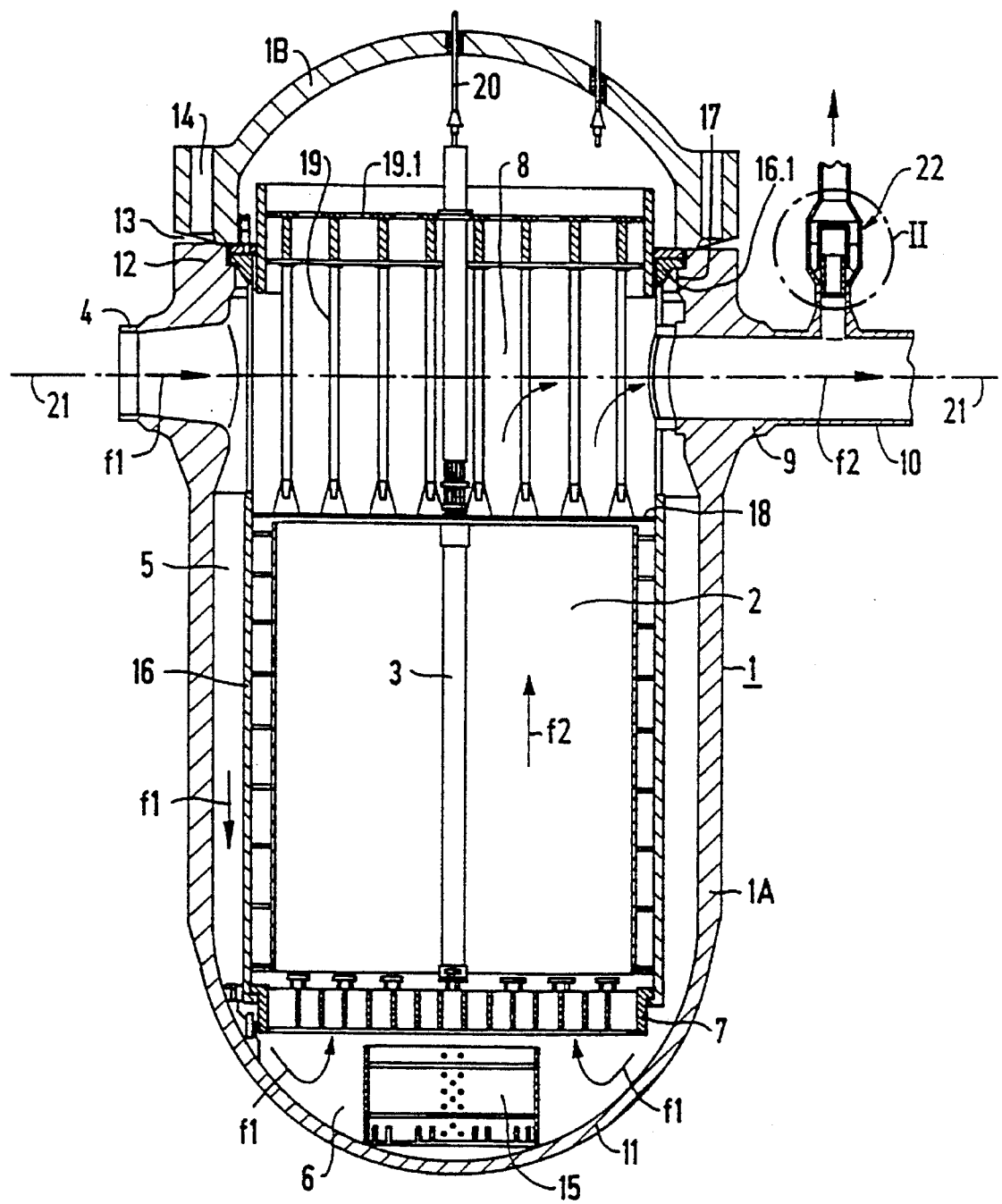
FIG. 1 is a fragmentary, diagrammatic, axial-sectional view of a nuclear reactor pressure vessel with a safety device according to the invention which includes a pressure relief valve incorporated into a primary coolant pipe.

Referring now to the figures of the drawing in detail and first, particularly, to FIG. 1 thereof, there is seen a diagrammatic, sectional view of a nuclear reactor pressure vessel 1 (referred to below as a pressure vessel) of a pressurized-water nuclear power station which is constructed, e.g., for a thermal reactor output of 3765 MW, corresponding to a gross electrical output of 1300 MW. A reactor core 2, which is composed of fuel assemblies of which only a single one 3 is shown, is cooled with light water which enters through inlet ports 4 and flows downward in an annular cavity 5 (shown by flow arrows f1). The cooling water flows upward from a bottom plenum 6 through a perforated lower grid 7, through cooling ducts of the fuel assemblies 3 in which it is warmed, and then flows from an upper plenum 8 through outlet ports 9 and a so-called hot primary-circuit pipe or pipeline 10 connected thereto to a non-illustrated steam generator where it conveys its heat through heat-exchanging tubes to a secondary coolant. The cooling-water flow through the reactor core 2, the upper plenum 8 and the outlet ports 9 is illustrated by flow arrows f2. The cooled cooling water, which is also known as the primary coolant, is pumped back from the steam generator through the non-illustrated so-called cold primary-circuit pipe to the inlet port 4 of the pressure vessel 1, so that a continuous circulation is established in normal operation.

In normal operation, the primary coolant which is in the primary circuit and therefore is also inside the pressure vessel 1, is at a pressure of approximately 158 bar, and coolant temperature at the outlet port 9 is approximately 329° C. The reactor pressure vessel 1, with its fittings, is constructed for this pressure and temperature load, including a safety margin. It is formed of a cup-shaped vessel bottom section 1A with a hemispherical dome 11 and a flange ring 12 at its upper end, to which a domed cover 1B having a counter flange 13 is bolted in a sealing manner. Cover bolts which are used are not shown, but bolt passage holes 14 can be seen. Only the most important of the fittings will be mentioned, which are a lower perforated drum 15 and the previously mentioned lower grid 7 above the lower perforated drum 15 which forms a bottom of a core barrel 16. The core barrel 16 is suspended by means of a supporting flange 16.1 on an annular shoulder 17 of the flange ring 12 and has a bottom section in which it accommodates the core 2 with the individual fuel assemblies 3. The core 2 is covered by an upper grid plate 18 on which a guide framework 19 having an upper support plate 19.1 is supported. Control rods 20 which can be lowered or raised by non-illustrated control rod drives disposed above the cover 1B, are inserted into a portion of the fuel assemblies. Four outlet ports 9 and four inlet ports 4 are alternately distributed over the perimeter of the pressure vessel 1 in a plane 21—21, in a four-loop system.

The primary coolant, which is held below a supercritical pressure and is therefore liquid in normal operation, not only covers the core 2 but also fills the upper plenum 8 up to about the upper support plate 19.1. Effective cooling is therefore ensured even of those fittings which are subject to so-called gamma heating by virtue of gamma radiation, even though they do not themselves generate heat (such as the fuel assemblies 3). If the water level in the pressure vessel drops, due to an extremely improbable failure of all of the cooling and emergency cooling devices, the temperature of the assembly (normally approximately 400° C.) starts to rise, and heat is increasingly conveyed, especially by radiation and conductance, through the pressure vessel 1, especially if the water level has dropped to the upper grid plate 18 or even slightly below. This overheating is utilized, in the still relatively early stage, by the safety device according to the invention, in order to reliably prevent overpressure failure of the pressure vessel 1 in the case of an inadequate core cooling mentioned above.

Figure 2:
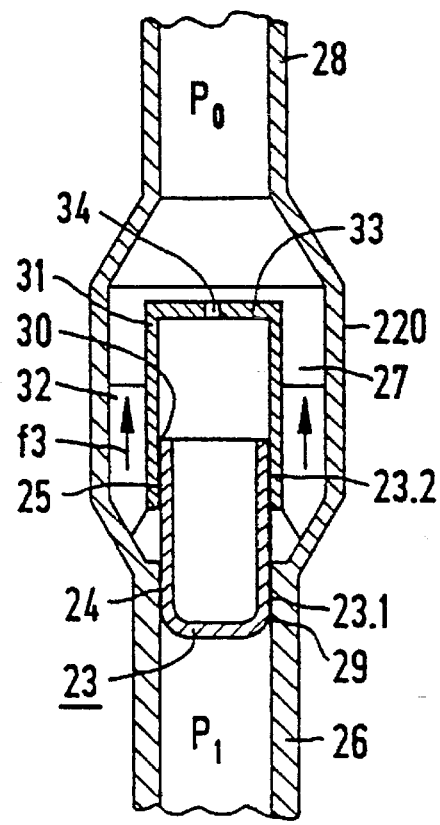
FIG. 2 is an enlarged, fragmentary view of a portion II of FIG. 1 showing the pressure relief valve.

To this end, a differential pressure-loaded pressure relief valve 22 is set into a coolant conducting surface or conduit which may be a wall of the pressure vessel 1 or a pipeline connected to the pressure vessel (the conduit shown is the hot primary coolant pipe 10). As is seen in FIG. 2, the valve 22 has a closure piece that is mounted in such a way as to be longitudinally displaceable. The closure piece is preferably a differential-pressure piston 23 which is held by a fusible stop 24, 25 in an illustrated closure position thereof so as to provide a seal. When the reactor interior reaches an upper threshold temperature which, for example, is 700° C., the fusible stop 24, 25 is caused to melt due to a threshold temperature heat flow reaching it. It can then no longer withstand the shear forces acting on it, so that the differential-pressure piston 23 is displaced into its open position due to the differential-pressure forces acting on it. The pressure difference is calculated as: $P=P_1-P_0$, where $P_1$=internal pressure, and $P_0$=external pressure. The pressure $P_1$ prevailing in the interior of the pressure vessel 1 can thus be reduced through a connection pipe socket 26 and an open cross section of the annular duct 27 leading into a pressurizer discharge line 28, through a pressure relief flow shown by arrows f3. The fusible stop 24 is disposed between sealing surfaces 23.1 of the piston 23 and associated seating surfaces 29 of the pressure relief valve 22. In the illustrated example, these seating surfaces 29 are formed by internal peripheral surfaces of the connection pipe socket 26 which may be provided with an additional reinforcement in the region of the seating surfaces. The fusible stop is constructed in such a way that at normal temperature it can easily withstand a differential pressure of 160 bar. As an additional safeguard, the further fusible stop 25 is disposed between peripheral piston surfaces 23.2 (at an insertion end of the piston 23) and guide surfaces 30 at an inner periphery of a guide cylinder 31. The piston 23 and the guide cylinder 31 are preferably constructed as hollow bodies, because such a structure causes the heat flow to reach the fusible solder selectively and without major losses.

The guide cylinder 31 is held in a centered position in a valve body 220 in such a way that the annular cavity or annular duct 27 remains free as an overflow duct, between the outer periphery of the guide cylinder 31 and the inner periphery of the valve body 220. Vanes 32 which are disposed in the annular cavity 27 hold the guide cylinder 31 in a centered position and are joined to a wall of the valve body. As is shown, the inlet cross section of the annular cavity or overflow duct 2 is sealed by the piston 23 in the normal position of the piston, but is cleared in a release position thereof. In the release position, the piston 23 is completely inserted into the guide cylinder 31. In order to generate the differential pressure at the piston 23, and in order to facilitate the insertion movement, the guide cylinder 31 has a bottom 33 which is provided with a pressure relief orifice 34 therein.

As was already mentioned and as is shown, the pressure relief valve 22 is set into the wall of the primary coolant pipe 10, and specifically into the wall of the so-called hot primary circuit, close to the pressure vessel 1. According to an alternative embodiment, the connection pipe socket 26 of the pressure relief valve 22 could be set into the cylinder wall of the pressure vessel 1 at the level of the primary coolant pipe sockets 4, 9 which are shown in FIG. 1, and specifically in a non-illustrated circumferential interspace therebetween.

Figure 3:
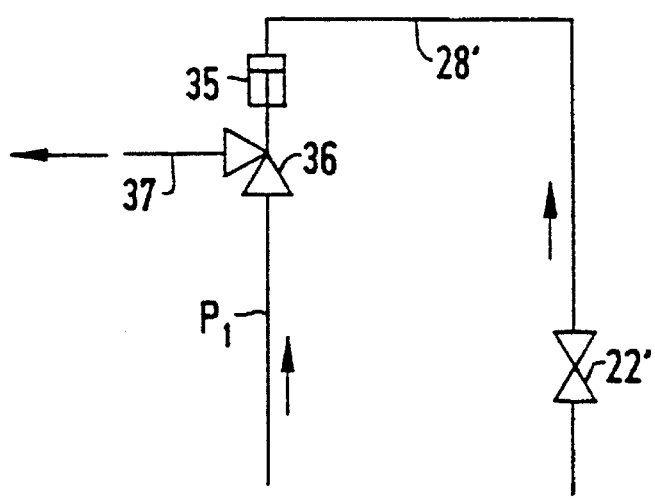
FIG. 3 is a schematic circuit diagram of a steam circuit in which a pressurizer discharge line of the pressure relief valve serves as a control line for controlling a relief valve.

Alternatively, the pressure relief valve 22 may be constructed as a pressure control valve 22' shown in FIG. 3. The pressure control valve 22' has correspondingly smaller cross-sectional dimensions, and instead of the pressure control line 28, a pressure control line 28' is provided which is connected to a servo piston unit 35 of a relief valve 36. This relief valve 36 is connected on the input side to the system pressure $P_1$, which it normally shuts off from a line 37 running to a non-illustrated pressurizer relief tank. It is only if the control valve 22' responds, in the case of overheating of the pressure vessel 1, that the relief valve 36 be would opened. This relief valve may be the relief valve which in any case is connected to the primary circuit in the vicinity of the pressurizer in conventional nuclear reactor plants.

The valve 22' (in its smaller embodiment as a pressure control valve) may alternatively be installed in the interior of the pressure vessel 1, e.g., in the vicinity of the lower grid 7 or the upper grid plate 18, so that it is disposed even closer to possible hot spots and thus responds even more quickly. The associated pressure control line 28' would then be run to the outside, in a pressure-tight manner, in the form of a thin measuring line through the cover 1B or at a point between the inlet and outlet ports 4, 9.

Whether a direct pressure relief function (FIGS. 1 and 2) or an indirect pressure relief function in the case of overheating is implemented, both configurations provide increased safety, because the pressure in the interior of the pressure vessel 1 is reduced to values below 30 bar. This ensures that even in the case of a so-called core meltdown, which may possibly be followed by melting of the pressure vessel bottom, the supporting and retaining structure of the pressure vessel 1, like the remaining nuclear reactor building structure, are only subjected, at most, to design forces. Since a core meltdown accident, for the standard pressurized-water reactor design, is an extremely improbable event, the relief valve 22 or 22' can be welded into the pipe socket 10 or the pressure vessel wall. Alternatively, a pressure-resistant flange link may be provided which permits inspection of the fusible points at certain intervals (when the pressure vessel is depressurized in any case because of fuel recharging).

I claim:

1. In a nuclear reactor having an interior, a pressure vessel, a coolant conducting surface exposed to primary pressure, and a core, a safety device against overpressure failure of the pressure vessel upon insufficient cooling of the core, comprising:

a differential-pressure-loaded pressure relief valve being set in the coolant conducting surface, said pressure relief valve having a hollow guide cylinder, a closure piece in the form of a differential-pressure piston being constructed as a hollow body and being longitudinally displaceable in said hollow guide cylinder between a closure position and an opening position, and a fusible stop sealing and retaining said differential-pressure piston in said closure position, said fusible stop melting due to a threshold temperature heat flow reaching said fusible stop upon reaching an upper threshold temperature in the interior of the reactor, for permitting said differential-pressure piston to move into said opening position.

2. The safety device according to claim 1, wherein the coolant conducting surface is a wall of the pressure vessel.

3. The safety device according to claim 1, wherein the coolant conducting surface is a pipeline connected to the pressure vessel.

4. The safety device according to claim 1, including a pressurizer discharge line being connected to said pressure relief valve and opening into a pressurizer relief tank.

5. The safety device according to claim 1, wherein said pressure relief valve has seating surfaces, said differential-pressure piston has sealing surfaces, and said fusible stop is disposed between said sealing surfaces and said seating surfaces.

6. The safety device according to claim 5, wherein said differential-pressure piston has peripheral piston surfaces, said guide cylinder has an inner periphery with guide surfaces, and said fusible stop is additionally disposed between said peripheral piston surfaces and said guide surfaces.

7. The safety device according to claim 1, wherein:

said pressure relief valve has a valve body with a wall and an inner periphery and said guide cylinder has an outer periphery, defining an annular duct remaining free as an overflow duct between said inner and outer peripheries;

said pressure relief valve has vanes being disposed in said annular duct and joined to said wall of said valve body for holding said guide cylinder in a centered position in said valve body; and said overflow duct has an inlet cross section being normally sealed by said differential-pressure piston in said closure position and being cleared and released in said opened position.

8. The safety device according to claim 1, wherein said guide cylinder has an end facing away from said differential-pressure piston, and said end has a bottom with a pressure relief orifice formed therein.

9. The safety device according to claim 1, wherein the coolant conducting surface is a primary coolant pipe having a wall, and said pressure relief valve is set into the wall near the pressure vessel.

10. The safety device according to claim 1, wherein the pressure vessel has primary coolant pipe sockets at a given level and a wall forming the coolant conducting surface, and said pressure-relief valve is set into the wall at the given level between the primary coolant pipe sockets.

11. The safety device according to claim 1, including a separate relief valve, and a pressure relief line being connected to said pressure relief valve and being constructed as a control line for said separate relief valve, said pressure relief valve and said control line having correspondingly low cross sectional dimensions.

* * * * *